Patented Feb. 13, 1923.

1,444,812

UNITED STATES PATENT OFFICE.

GASTON D. THÉVENOT, OF NEW YORK, N. Y.

PROCESS OF MAKING VEGETABLE MILK.

No Drawing.   Application filed February 21, 1922. Serial No. 538,365.

*To all whom it may concern:*

Be it known that I, GASTON D. THÉVENOT, a citizen of the United States, residing at New York city, New York, have invented certain new and useful Improvements in Processes of Making Vegetable Milk, of which the following is a clear, full, and exact description.

My invention relates to improvements in vegetable milk and has for its object the preparation of a milk of this character which shall be rendered as free as possible from objectionable taste or color due to the substance or substances from which it is made and in which substantially all of the desirable ingredients, including the vitamines, are retained.

It is well known that vegetable milk may be obtained from a number of legumes, but among these the soy bean is to be preferred because of the fact that it contains the nourishing properties found in cow's milk to a larger degree than other legumes at present available. The use of this bean, however, is attended with some objections, the principal one being the taste. Another objection is the color, although for many uses to which the milk may be put this is not important.

Various methods have heretofore been proposed to lessen the objectionable taste, and among these methods the subjecting of the beans to heat has been found efficacious. I have found, however, that if the temperature to which the beans are subjected is too high, or if they are too long subjected to even a reasonably high temperature, there are other disagreeable tastes developed, which are equally objectionable. By my improved process, however, the beans are so treated throughout the entire process of forming the vegetable milk therefrom so that the objectionable color, and particularly the taste, is eliminated to a very great degree, at the same time avoiding the introduction of any step in the process which would introduce other undesirable tastes to the finished product. Furthermore, the valuable ingredients of the bean are preserved.

In order to accomplish these results, I first subject the beans to a soaking in water after, of course, the usual preliminary washing, and this soaking may be done in cold water, but this takes considerable time so that I preferably start the soaking process with warm water, the water used being of a temperature approximately 50° C. but not higher. This soaking is continued for approximately four hours after which the water is drawn off and cold water added, the beans being allowed to soak in the cold water approximately ten to twelve hours.

After the soaking in cold water has been carried to a degree whereby the beans are rendered soft, the water is drawn off and the beans are ground or mashed, after which they are mixed for a few minutes with water or preferably with spargings (which term as used in this specification will be defined later), the water or spargings being at such a temperature that the whole mass is raised to approximately 70° C. but not substantially higher. Preferably I accomplish this step in the process by running in the water or spargings at the boiling point of water, and the proportions are about four parts, by weight, of water or spargings to one part of beans. The effect of this treatment is to practically eliminate the disagreeable beany taste already referred to. It is to be noted that this step of the process is continued only for a few minutes, after which the mass is put into a filter press or centrifuge. The resulting filtrate is a milky substance containing many desirable constituents of ordinary milk although lacking in some of the ingredients. For instance, it is deficient in salt and sugar. For some purposes, however, the product as it comes from the filter press or centrifuge may be bottled for future use, or it may be evaporated to any desired consistency, or formed into a powder. For other purposes it may be desired to add salt and sugar and also to neutralize any acid which may be and which usually is present. I prefer to use bicarbonate of soda, for the latter purpose. The addition of these ingredients is, of course, made prior to the concentration of the filtrate.

In the process of drying, I prefer to use a spray dryer because by this means the temperature of the concentrate is not raised sufficiently high to produce any of the objectionable tastes to which reference has been made. In order to recover as much of the liquid as possible, I run clear wash water into the filter or centrifuge and this wash water is formed in the spargings already referred to. Preferably it is run into a separate tank where it is heated to the temperature of boiling water and mixed with the mashed beans as already described. Of course, when the process is first started, clear water is used at this step of the process and of course it will be understood that clear water may be used in treating succeeding batches, although the uses of the spargings will make the whole process more economical.

It will thus be noted that throughout all of the steps of my process I do not raise the temperature of the materials treated to a higher temperature than approximately 70° C.

This, however, is sufficient to rid the resulting milk of the soy bean taste, but not high enough to coagulate the valuable proteids or otherwise change their composition in such a way as to affect the taste. The valuable food elements of the bean, including the vitamines, are likewise preserved.

What I claim as new is:

1. The process of preparing vegetable milk from soy beans or the like, which consists in soaking the beans in water at a temperature not exceeding 50° C., drawing off the water, grinding or mashing the beans, mixing the same with water so that the temperature of the mixture rises to about 70° C. but not substantially higher, and then filtering or centrifuging the mass so obtained.

2. The process of preparing vegetable milk from soy beans or the like, which consists in soaking the beans in warm water at a temperature of approximately 50° C. for a few hours, draining off the water, soaking the beans in cold water for approximately two to three times as long as the previous soaking, again drawing off the water, grinding or mashing the beans, mixing them with water so that the temperature of the mixture rises to about 70° C. but not substantially higher, and then filtering or centrifuging the mass so obtained.

3. The process of preparing vegetable milk from soy beans or the like, which consists in soaking the beans in water at a temperature of approximately 50° C. or lower, draining off the water, grinding or mashing the beans, mixing the same for a few minutes with boiling water in the proportion of approximately four parts water to one part beans by weight, and then filtering or centrifuging the mass thus obtained.

4. The process of preparing vegetable milk from soy beans, which consists in soaking the beans in warm water at a temperature of approximately 50° C. for a few hours, draining off the water, soaking the beans in cold water for approximately two to three times the length of time of the first soaking, again drawing off the water, grinding or mashing the beans, mixing them with boiling water for a few minutes in proportion of four parts water to one part beans by weight, and then filtering or centrifuging the mass so obtained.

5. The process of preparing vegetable milk from soy beans, which consists in soaking the beans in water at a temperature of approximately 50° C. or below, drawing off the water, grinding or mashing the beans, mixing them with water so that the temperature of the mixture rises to about 70° C. but not substantially higher, filtering or centrifuging the mass, washing the residue with clear water and using the wash water, heated to the proper temperature, in mixing with the mashed beans in a subsequent operation.

6. The process of preparing vegetable milk from soy beans, which consists in soaking the beans in warm water at a temperature of about 50° C. for a few hours, drawing off the water, soaking the beans for approximately two to three times as long in cold water, again drawing off the water, grinding or mashing the beans, mixing the same for a few minutes with spargings from a previous batch, said spargings heated to the boiling point, filtering or centrifuging the mass, rinsing or washing the residue with clear water to form spargings for a succeeding batch.

7. The process of preparing vegetable milk from soy beans, which consists in soaking the beans in water at a temperature approximating 50° C. or less, drawing off the water, grinding or mashing the beans, mixing the same with water or spargings so that the temperature of the mixture rises to about 70° C. but not substantially higher, filtering or centrifuging the mass and mixing the filtrate with salt, bicarbonate of soda and sugar.

8. The process of preparing vegetable milk from soy beans, which consists in soaking the beans in water at a temperature approximating 50° C. or less, drawing off the water, grinding or mashing the beans, mixing the same with water or spargings so that the temperature of the mixture rises to about 70° C. but not substantially higher, filtering or centrifuging the mass and mixing the filtrate with salt, bicarbonate of soda and sugar in the proportions, by weight, of approximately fifteen units of salt, five units of bicarbonate of soda, and six hundred units of sugar to one thousand units of beans.

9. The process of preparing vegetable milk from soy beans, which consists in soaking the beans in water at a temperature of approximately 50° C. or lower, drawing off the water, grinding or mashing the beans, mixing them with water or spargings so that the temperature of the mixture rises to about 70° C. but not substantially higher, filtering or centrifuging the mass, mixing with the filtrate, salt, bicarbonate of soda and sugar and evaporating the same to about half of its original volume.

10. The process of preparing vegetable milk from soy beans, which consists in soaking the beans in water at a temperature of approximately 50° C. or lower, drawing off the water, grinding or mashing the beans, mixing them with water or spargings so that the temperature of the mixture rises to about 70° C. but not substantially higher, filtering or centrifuging the mass, mixing with the filtrate, salt, bicarbonate of soda and sugar and evaporating the same to about half of its original volume, and forming the concentrated liquor into a powder in a spray dryer.

Signed at New York city, New York, this 18th day of February 1922.

GASTON D. THÉVENOT.